United States Patent
Moser et al.

[15] 3,696,664
[45] Oct. 10, 1972

[54] TORSIONAL OSCILLATOR

[72] Inventors: Kurt Moser, Fribourg; Beat Höchli, Bern, both of Switzerland

[73] Assignee: Lonza, Ltd., Gampel (Valais) (Direction Basel), Switzerland

[22] Filed: Dec. 16, 1970

[21] Appl. No.: 98,819

[30] Foreign Application Priority Data

Dec. 17, 1969 Switzerland............18703/69

[52] U.S. Cl....................................................73/99
[51] Int. Cl.................................................G01n 3/32
[58] Field of Search..........................................73/99

[56] References Cited

UNITED STATES PATENTS 3,501,952  3/1970  Gergen et al. ............73/99 X
3,313,148  4/1967  Dautreppe et al............73/99

Primary Examiner—Jerry W. Myracle
Attorney—Brady, O'Boyle & Gates

[57] ABSTRACT

A torsional oscillation device for testing plastics material having a first clamp for holding one end of a plastics test specimen and a second clamp for the opposite end of the specimen. The second clamp is rigidly connected to an oscillator unit suspended from means for applying tension to hold the test specimen in tension, whereby the specimen, the oscillator unit and the second clamp form a torsion pendulum. A temperature chamber surrounds the specimen and a device measures the duration of oscillations of the torsional oscillation of the torsion pendulum. The means for applying tension is connected to a converter which converts the longitudinal movements of the tensioner into correspondingly valued electrical signals which render an indication of alterations in length of the test specimen.

6 Claims, 1 Drawing Figure

PATENTED OCT 10 1972
3,696,664
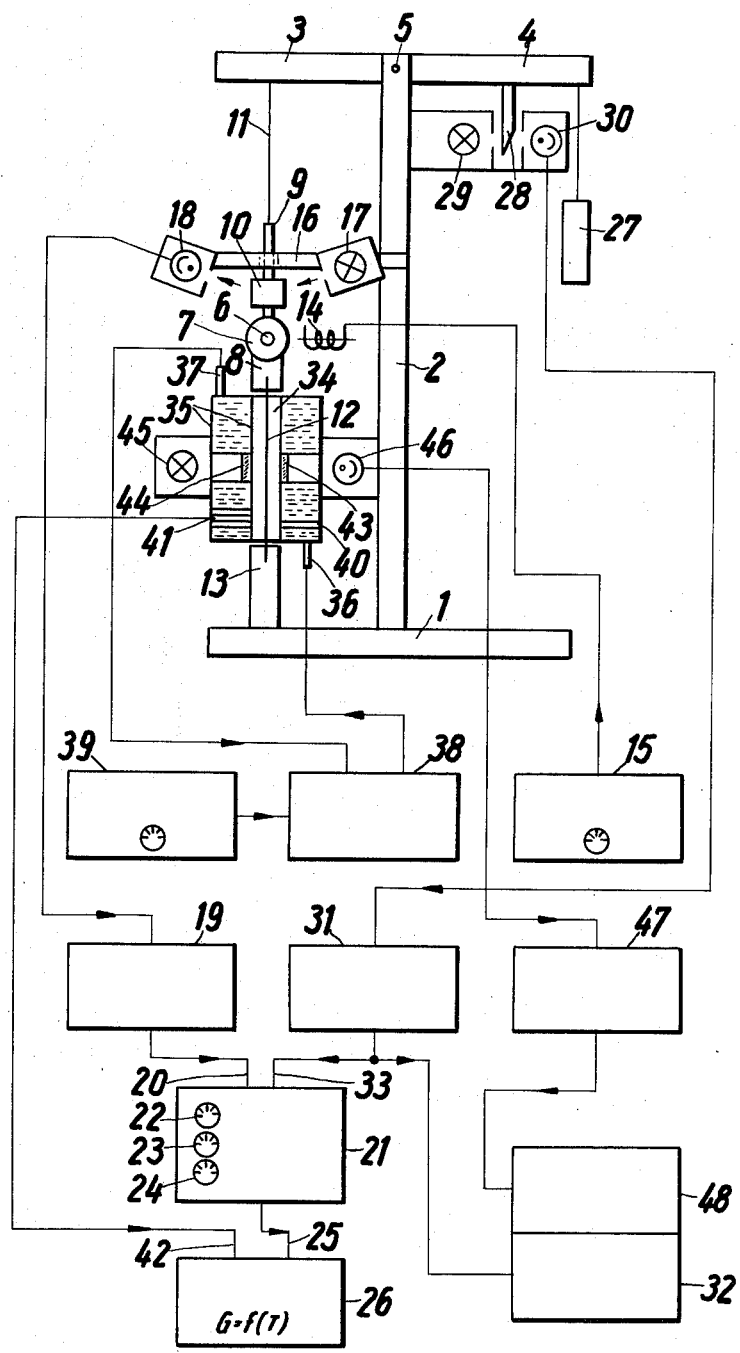
Inventors
KURT MOSER
BEAT HÖCHLI
BY Brady, O'Boyle & Gates
ATTORNEYS

TORSIONAL OSCILLATOR The present invention relates to a torsional oscillator for plastics material testing, comprising of a first loading clamp for holding one end of a plastics material test specimen in a second loading clamp for the other end of the test specimen, the second loading clamp being rigidly connected to an oscillator unit suspended from means for applying tension to hold the clamped test specimen stretched, a temperature chamber for the loaded test specimen and a device for measuring of the duration of the oscillations of the torsional oscillations of the torsion pendulum formed by the test specimen and the oscillator unit with the second loading clamp.

Devices of this kind serve for the determination of the shear modulus of the plastics material. The torsion pendulum is excited to oscillate. From the duration of the oscillation, the moment of inertia of the oscillator unit with the second loading clamp and the dimensions of the test specimen held between the loading clamps, the shear modulus of the plastics material is calculated. The relationship of the shear modulus to the temperature is then given from a number of measurements carried out at different temperatures.

At relatively high temperatures the plastics material becomes malleable and the test specimen is extended. In order to avoid this as far as possible, in the case of a known oscillation device in which, differing from the devices of the kind initially referred to, a driven plate constituting the oscillation unit hangs on the plastic test specimen (DIN 53,445 of November 1965), a stop device has been provided by means of which the test specimen can be relieved of loading during the heating up periods (between the oscillation tests). In addition a vertical measurement scale has been provided beside the driven plate, in order to be able to measure alterations in the length of the test specimen. The relieving of the test specimen from loading is not unconditionally desirable since the flowing of the plastic occurring at the higher temperatures can also be of interest. The measurement with the vertical scale is troublesome, since it is necessary to look precisely over the surface of the driven plate. The measurement is imprecise if the plate, for example as the result of non-uniform extension of the test specimen, deviates from a horizontal attitude.

It is an object of the present invention to mitigate this disadvantage.

According to the present invention a torsional oscillation device for plastics material testing, comprising a first loading clamp for holding one end of a plastics material test specimen and a second loading clamp for the other end of the test specimen, the second loading clamp being rigidly connected to an oscillator unit suspended from means for applying tension to hold the test specimen stretched, a temperature chamber for the test specimen and a device for the measuring the duration of the oscillations of the torsional oscillation of the torsion pendulum formed by the test specimen and the oscillator unit with the second loading clamp, wherein the means for applying tension is operatively connected to a converter for converting of the longitudinal movements of the tensioner into corresponding values of an electric current or electric voltage which constitutes the measured value converter of a device for the electrical measurement of alterations in length of the test specimen.

The present invention may be employed in the case of a device operating automatically, which after the test specimen has been set up automatically carries out all the measurement processes, such as temperature control, excitation of oscillations and recording of the oscillation or of the duration of oscillation or of the shear modulus (Periodical "Knuststoffe," Volume 57, 1967, Number 4, page 259, or the Periodical "Plastics and Polymers," Volume 37, 1969, Number 131, pages 469 to 474), also to record the extension of the plastic test specimen as a function of the temperature, or to take it into account in an automatic calculation of the shear modulus.

The invention will be more readily understood from the following description given by way of example of an embodiment thereof with reference to the accompanying drawing, in which a torsion pendulum and devices incorporated with it are shown at the top and below this a block circuit diagram is shown.

Referring to the FIGURE, at the upper end of the column 2 of a stand 1, 2 a two-armed lever having arms 3, 4 is supported free to swing about a horizontal shaft 5. At the free end of the lever arm 3 an oscillation unit 6 . . . 10 is suspended on a twistable thread 11 practically free from directional forces. The oscillation unit consists of a horizontal bar 6 shown in end elevation, which carries each at the same distance from its center cylindrical bodies 7 of magnetically conductive material.

In the center of the bar 6 there is at its underside a loading clamp 8 for the upper end of a plastic test strip 12 (shown in longitudinal section in the sketch). A loading clamp 13 for the lower end of the test specimen 12 is rigidly connected to the base plate 1 of the stand.

In front of one of the bodies 7, an electromagnet 14 is fixed to the stand 1, 2 in a manner not illustrated, which is briefly excited from pulse generator 15 which has an adjustable pulse interval of for example 0.5 to 15 minutes, in order to exert with each electrical pulse a turning impulse upon the torsion pendulum constituted by the oscillation unit 6 . . . 10 and the test specimen 12, and in this way to excite the same periodically to damped oscillations.

In the center of the bar 6 is fixed a shaft 9 extending upwards which passes freely with a lateral clearance through a boring in a traverse guide 16 forming part of the stand 1, 2 and which is fastened at the upper end to the thread 11. The shaft 9 carries a mirror 10.

A light source 17 has its beam directed onto the mirror 10. In the mean position of the mirror, that is when the test specimen 12 is not twisted, the light beam reflected from the mirror 10 strikes a photoelectric cell 18 which is connected to a frequency meter 19, which responds to each second light-beam pulse. The output of the frequency meter 19, representing the frequency, is led to an input 20 of an analogue computer 21 which has setting devices 22, 23, 24 for the measurements of the test specimen, and which calculates the shear modulus of the plastic of the test specimen from these measurements, the frequency and pre-determined constants. The output of the analogue computer respesenting the shear modulus (G) is led to an input 25 of a coordinate recorder 26.

At the free end of the other lever arm 4 there is suspended a counterweight 27 that is rather heavier than is necessary to compensate for the force of gravity of the oscillation unit 6 ... 10, in order to ensure that the upper loading clamp 8 reliably follows alterations in length of the test specimen 12. In addition a neutral wedge 28 is fixed to the lever arm 4, which is disposed between a light source 29 and a photoelectric cell 30. If the length of the test specimen 12 alters, the two-arm lever 3, 4 makes a corresponding movement, through which the wedge 28 alters the illumination of the photoelectric cell 30, so that this alteration of the photoelectric current is a measure for the alteration in length of the test specimen 12. The photoelectric current of the photoelectric cell 30 is led to a switch 31, which passes a current proportional to the alteration in length to a recorder 32 for the alteration in length and to an input 33 of the analogue computer. The analogue computer adds the alteration in length to the length of the test piece originally fed in to it, and calculates from the length and thickness as preset and the alteration in length the related alteration in thickness, in order to calculate the shear modulus from the length and thickness then obtaining and also the remaining data. Obviously it is also possible for the alteration of the width of the test specimen as well as that of the thickness to be taken into account. Instead of the wedge 28 it is possible to employ two apertures, for example with parallel slots, one of which is connected to the lever arm 4 and the other of which is fixed.

In the place of the arrangement 28, 29, 30 it is also possible to employ another converter for the conversion of the longitudinal movement of the thread 11 occurring with an alteration in length of the test specimen 12 into a corresponding electrical quantity. For example the thread can run over a roller which is freely rotatable and connected with the sliding contact of a potentiometer. This and a second, manually adjustable potentiometer are connected in parallel to a current source. Then a current proportional to the alteration in length of the test specimen occurs between the sliding contacts of the two potentiometers, if the second potentiometer is so adjusted before the measurement that the voltage between the two sliding contacts was zero.

Between the two loading clamps 8 and 13 there extends a temperature chamber 34 with a double-walled housing 35, the hollow space of which is provided with an inlet 36 and an outlet 37 for a heating fluid, which is held maintained by means of an adjustable thermostat 38 at a selectable controlled temperature which may be constant or which may be varied as desired by programmed controller 39 (e.g., with hourly temperature alteration within the range of 3° to 180° C). A supply line 40 for an inert gas leads into the chamber 34. The housing 35 has a radial drilling for an electrical temperature probe 41 serving for the measurement of the temperature (T) in the chamber, which is connected to the other input 42 of the co-ordinate recorder 26.

In a modification of the arrangement shown in the diagram, the loading clamps 8 and 13 can extend into the chamber 34 or can be arranged wholly within it. They seal the chamber 34 as gastight as possible, the upper loading clamp being however freely rotatable and axially displaceable.

The housing 35 of the chamber 34 has two diametrically opposite windows 43, 44 for a photoelectric device 45, 46, 47 for the measurement of the transparency of the test specimen 12. This device has a light source 45, the light beam of which enters the chamber 34 through the window 44, leaves through the other window 43 after being weakened to an extent corresponding to the transparency of the test specimen 12, and impinges upon a photoelectric cell 46, the photoelectric current of which constitutes a measure for the transparency of the test specimen 12. The photoelectric cell 46 is connected to a switch 47 that supplies a current corresponding to the transparency to a recorder 48, which progressively records the transparency.

The optical components (e.g., lenses and apertures) of the photoelectric devices 10, 17, 18 and 28, 29, 30 and also 45, 47 are not illustrated in the sketch. The photoelectric components 18, 30 and 46 can be photoelectric cells of photo-resistors.

With the device as described it is possible for the extension of the test specimen occasioned by the torsional oscillation tests to be completely automatically measured, recorded and evaluated. It is only necessary to set up the test specimen in the leading clamps, feed the dimensions of the test specimen into the analogue computer and select the temperature programme. Then the co-ordinate recorder draws a diagram of the shear modulus taking into account the extension of the test specimen as a function of the temperature, and simultaneously the two other recorders record the alteration in length and the transparency of the test specimen during the temperature programme. If the temperature is held constant, it is possible to check the stability of the plastics material at the relevant temperature.

The oscillation unit can be so arranged that its moment of inertia can be varied. In this case the analogue computer is equipped with an additional setting device, on which the moment of inertia pertaining to the time is set.

Instead of the frequency of the torsional oscillation it is also possible to measure the oscillation duration reciprocal to this and for a corresponding electrical quantity to be fed to the analogue computer.

In order to measure the transparency of the test specimen 12 not only on a part, as shown in the FIGURE, but integrally over the whole surface, it is possible for the photoelectric component 46, the light-sensitive area of which is as a rule smaller than the test specimen, to be connected with the window 43 through a light-conductor (the window being larger in this case), when the ends of the glass fibers of the light-conductor are focused on the photoelectric component and are uniformly disposed over the opening of the associated window. A suitably arranged light-conductor can also be disposed between the light source 45 and the (in this case larger) window 44. The use of a light-conductor is also advantageous in cases of small windows the openings of which can easily be uniformly illuminated or can be covered by a photoelectric component, in order in particular to arrange the latter at a greater distance from the temperature chamber and thus to exclude thermal influences from it.

What we claim is:

1. A torsional oscillation device for plastics material testing, comprising
    a first clamp (13) for holding one end of a plastics material test specimen (12) and a second clamp (8) for the other end of said test specimen (12), an inertia unit (6 ... 10) rigidly connected to said second clamp (8);

said inertia unit (6 ... 10) with said second clamp (8) being adapted to form together with said test specimen (12), when held between said first and second clamps (13,8), a torsion pendulum, means (11, 3, 4, 27) adapted for pivotal movement for applying tension to hold said test specimen (12) stretched, said inertia unit (6 ... 10) being suspended from said tension applying means, a temperature chamber (34) for the test specimen (12), a device (17, 10, 18, 19) for measuring the period of oscillations of said torsion pendulum (6 ... 10, 12, 13), means (29, 28, 30, 31) for electrically measuring alterations in length of the test pendulum (12) comprising a converter (29, 28, 30) operatively connected to said tension applying means (11, 3, 4, 27) for converting the pivotal movements thereof into corresponding electric currents or voltages.

2. A torsional oscillation device as set forth in claim 1 including an electric computer (21) for the determination of the shear modulus of the plastics material of the test specimen (12) from the oscillation period of the torsion pendulum (6 ... 10, 12, 13), the moment of inertia of the inertia unit (6 ... 10) with the second clamp (8) and the original width and thickness and altered length dimension of the test specimen (12), said computer including an input (20) connected to said device (17, 10, 18, 19) for measuring the period of oscillations of said torsion pendulum (6 ... 10, 12, 13) and an input (33) connected to said means (29, 28, 30, 31) for electrically measuring alterations in length of the test specimen (12).

3. A torsional oscillation device as set forth in claim 2, including means (7, 14, 15) coupled to said torsion pendulum for effecting automatic oscillation of said torsion pendulum (6 ... 10, 12, 13), means (39, 38, 35, 36, 37) connected to said temperature chamber for programmed control of the temperature in the temperature chamber (34), temperature sensing means (41) connected for sensing the temperature in the temperature chamber (34), and recording means (26) for the time-related simultaneous recording of the temperature of the temperature chamber (34) and the shear modulus determined by the computer, said recording means (26) having an input (42) connected to said temperature sensing means (41) and an input (25) connected to said computer (21).

4. A torsional oscillation device as set forth in claim 1 including an electric computer (21) for the determination of the shear modulus of the plastics material of the test specimen (12) from the oscillation period of the torsion pendulum (6 ... 10, 12, 13), the amount of inertia of the inertia unit (6 ... 10) with the second clamp (8) and the original width, altered length and correspondingly altered thickness dimension of the test specimen (12) calculated from the alteration in length, said computer having an input (20) connected to said device (17, 10, 18, 19) for measuring the period of oscillations of said tosion pendulum (6 ... 10, 12, 13), and an input (33) connected said means (29, 28, 30, 31) for electrically measuring alterations in length of the test specimen (12).

5. A torsional oscillation device as set forth in claim 4, including means (7, 14, 15) coupled to said torsion pendulum for effecting automatic oscillation of said torsion pendulum (6 ... 10, 12, 13), means (39, 38, 35, 36, 37) connected to said temperature chamber for programmed control of the temperature in the temperature chamber (34), temperature sensing means (41) connected for sensing the temperature in the temperature chamber (34), and recording means (26) for the time-related simultaneous recording of the temperature of the temperature chamber (34) and the shear modulus determined by the computer, said recording means (26) having an input (42) connected to said temperature sensing means (41) and an input (25) connected to said computer (21).

6. A torsional oscillation device as set forth in claim 1, including means (7, 14, 15) coupled to said torsion pendulum for effecting automatic oscillation of said torsion pendulum (6 ... 10, 12, 13), means (39, 38, 35, 36, 37) connected to said temperature chamber for programmed control of the temperature in the temperature chamber (34), temperature sensing means (41) connected for sensing the temperature in the temperature chamber (34), and recording means (26,32) for the time-related simultaneous recording of the temperature in the temperature chamber (34), the tension of the test specimen (12) and the period of oscillations, said recording means being connected to said temperature sensing means (41) and to said means (29, 28, 39, 31) for the measurement of alterations in length of the test specimen (12), and to said device (17, 10, 18, 19) for measuring the period of oscillations.

* * * * *